United States Patent
Kujirai et al.

(12) 
(10) Patent No.: US 6,509,977 B1
(45) Date of Patent: Jan. 21, 2003

(54) PRINTING CONTROL SYSTEM, PRINTING CONTROL METHOD AND STORAGE MEDIUM

(75) Inventors: Yasuhiro Kujirai, Tokyo (JP); Koji Nakagiri, Kawasaki (JP); Satoshi Nishikawa, Yokohama (JP); Yasuo Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/494,300

(22) Filed: Jan. 31, 2000

(30) Foreign Application Priority Data

Feb. 3, 1999 (JP) ............................................. 11-026661

(51) Int. Cl.⁷ .............................................. G06K 15/00
(52) U.S. Cl. ....................................... 358/1.18; 358/1.1
(58) Field of Search .................................. 358/1.1, 1.12, 358/1.13, 1.14, 1.15, 1.18, 1.16, 448, 449, 452; 707/517, 520, 521, 527; 412/9, 1, 11, 16, 19, 33

(56) References Cited

U.S. PATENT DOCUMENTS 5,735,659 A * 4/1998 Kosasa et al. ................. 412/11
6,417,931 B2 * 7/2002 Mori et al. ................. 358/1.12

* cited by examiner

*Primary Examiner*—Arthur G. Evans
(74) *Attorney, Agent, or Firm*—Fitzpatrick, Cella, Harper & Scinto

(57) ABSTRACT

In a case where printing control is configured using a unified user interface and bookbinding printing has been set, bookbinding format conditions are judged and functions possessed redundantly by first and second information processing units are controlled to make appropriate printing control possible in conformity with settings made by a user.

21 Claims, 18 Drawing Sheets

F I G. 14

Canon LASER SHOT LBP-850 PROPERTY

GENERAL | DETAILS | SHARED | PAGE SETTING | FINISHING | PAPER FEED | PRINT QUALITY | DEVICE SETTING

PREFERENCES: STRING DATA 1 [ADD] [EDIT]

- ○ SINGLE-SIDED PRINTING
- ○ DOUBLE-SIDED PRINTING
- ● BOOKBINDING PRINTING    ☑ CENTER STAPLING    [BOOKBINDING DETAILS]

BINDING DIRECTION: [BIND ON LONG SIDE AT LEFT ▼]

DESIGNATE SORTER
- ● NO DESIGNATION
- ○ SORT
- ○ STAPLE
- ○ GROUP

BINDING DESIGNATION
- ☐ ROTATE
- ☐ PUNCH
- ☐ Z-FOLD

STAPLING POSITION DESIGNATION

[ACQUIRE PRINTER INFORMATION] [SET DEIVCE] [RETURN TO START]

[OK] [CANCEL] [APPLICATION (A)] [HELP]

FIG. 15

BOOKBINDING DETAILS ☒

METHOD OF BOOKBINDING PRINTING: ⦿ PRINT GATHERING ALL PAGES TOGETHER
○ PRINT IN SEVERAL BUNDLES

◧ ◨ 0 ◀▶ GATHER IN BUNDLE SHEET BY SHEET (1-10 SHEETS)

OPENING DIRECTION: ☒ OPENS TO LEFT / UP ▶

BINDING MARGIN: 0 ◀▶ mm

[ OK ] [ CANCEL ] [ HELP ]

PRINTING CONTROL SYSTEM, PRINTING CONTROL METHOD AND STORAGE MEDIUM

BACKGROUND OF THE INVENTION

This invention relates to a printing control system and method and to a storage medium storing program code for executing the printing control method using a computer.

Devices such as laser printers and copiers come equipped with a bookbinding printing function for placing pages in the proper order when a plurality of pages from an application are folded in half.

In another method, the bookbinding printing function is implemented by processing performed on the host side, in which print data is spooled temporarily and the format of the data manipulated.

Thus, bookbinding printing presently can be performed by the two methods described above. However, in an environment in which it is possible to utilize the bookbinding printing function redundantly in the printing process, the relevant printing settings are made from independent user interfaces. As a consequence, there is the possibility that the user configuring bookbinding printing will become confused.

In other words, in a case where bookbinding printing is configured by configuring printing from independent user interfaces, operability is poor because the user cannot tell whether the desired bookbinding format has been configured properly.

SUMMARY OF THE INVENTION

Accordingly, an object of the present invention is to make appropriate printing control possible in conformity with settings made by a user in a case where printing control is configured using a unified user interface and bookbinding printing has been, wherein bookbinding format conditions are judged and functions possessed redundantly by first and second information processing units are controlled efficiently to achieve the aforesaid printing control.

According to the present invention, the foregoing object is attained by providing a printing control apparatus, printing control method and storage medium characterized as set forth below.

Specifically, the present invention provides a printing control system for printing print data generated by an information processing apparatus, comprising: input means for configuring bookbinding by designating a page layout on a recording medium; storage means for storing the print data so that the print data can be read out in a desired sequence in units of individual pages; allocation means for deciding, based upon bookbinding settings, whether control of bookbinding is to be performed by a first information processing unit or a second information processing unit; layout means for controlling page layout of the print data in accordance with the bookbinding settings and decision made by the allocation means; and output means for reading print data out of the storage means in a sequence that is in accordance with the controlled page layout, and subjecting the print data to print processing.

Preferably, the storage means stores the print data in a data format, in which printing can be controlled, before the generation of final print data.

Preferably, the allocation means controls the layout of pages on a recording medium, on the basis of prescribed print-format data that has been input from the input means, in such a manner that when all printouts are overlapped and folded in half, the pages will be in numerical order.

Preferably, the allocation means controls the layout of pages on a recording medium, on the basis of prescribed print-format data that has been input from the input means, in such a manner that when printouts on a prescribed number of sheets are overlapped and folded in half, the pages will be in numerical order.

Preferably, the allocation means decides whether bookbinding processing is to be executed by the first information processing unit or by the second information processing unit in accordance with a command from a user.

Preferably, the bookbinding settings include orientation information for setting whether bound pages open to the right or open to the left, and the layout means decides the layout of pages in conformity with the orientation information.

Preferably, the allocation means causes the first information processing unit and the second information processing unit to share bookbinding control at a predetermined ratio in accordance with a command from a user.

Further, the present invention provides a printing control method for printing print data generated by an information processing apparatus, comprising: an input step of configuring bookbinding by designating a page layout on a recording medium; a storage step of storing the print data so that the print data can be read out in a desired sequence in units of individual pages; an allocation step of deciding, based upon bookbinding settings, whether control of bookbinding is to be performed by a first information processing unit or a second information processing unit; a layout step of controlling page layout of the print data in accordance with the bookbinding settings and decision made at the allocation step; and an output step of reading print data out of storage means in a sequence that is in accordance with the controlled page layout, and subjecting the print data to print processing.

Preferably, the storage step stores the print data in the storage means in a data format, in which printing can be controlled, before the generation of final print data.

Preferably, the allocation step controls the layout of pages on a recording medium, on the basis of prescribed print-format data that has been input at the input step, in such a manner that when all printouts are overlapped and folded in half, the pages will be in numerical order.

Preferably, the allocation step controls the layout of pages on a recording medium, on the basis of prescribed print-format data that has been input at the input step, in such a manner that when printouts on a prescribed number of sheets are overlapped and folded in half, the pages will be in numerical order.

Preferably, the allocation step decides whether bookbinding processing is to be executed by the first information processing unit or by the second information processing unit in accordance with a command from a user.

Preferably, the bookbinding settings include orientation information for setting whether bound pages open to the right or open to the left, and the layout step decides the layout of pages in conformity with the orientation information.

Preferably, the allocation step causes the first information processing unit and the second information processing unit to share bookbinding control at a predetermined ratio in accordance with a command from a user.

Further, the present invention provides a storage medium storing a printing control program for printing print data generated by an information processing apparatus, the control program comprising: code of an input step of configuring bookbinding by designating a page layout on a recording medium; code of a storage step of storing the print data so that the print data can be read out in a desired sequence in units of individual pages; code of an allocation step of deciding, based upon bookbinding settings, whether control of bookbinding is to be performed by a first information processing unit or a second information processing unit; code of a layout step of controlling page layout of the print data in accordance with the bookbinding settings and decision made at the allocation step; and code of an output step of reading print data out of storage means in a sequence that is in accordance with the controlled page layout, and subjecting the print data to print processing.

Preferably, the code of the storage step stores the print data in the storage means in a data format, in which printing can be controlled, before the generation of final print data.

Preferably, the code of the allocation step controls the layout of pages on a recording medium, on the basis of prescribed print-format data that has been input at the input step, in such a manner that when all printouts are overlapped and folded in half, the pages will be in numerical order.

Preferably, the code of the allocation step controls the layout of pages on a recording medium, on the basis of prescribed print-format data that has been input at the input step, in such a manner that when printouts on a prescribed number of sheets are overlapped and folded in half, the pages will be in numerical order.

Preferably, the code of the allocation step decides whether bookbinding processing is to be executed by the first information processing unit or by the second information processing unit in accordance with a command from a user.

Preferably, the bookbinding settings include orientation information for setting whether bound pages open to the right or open to the left, and the code of the layout step decides the layout of pages in conformity with the orientation information.

Preferably, the code of the allocation step causes the first information processing unit and the second information processing unit to share bookbinding control at a predetermined ratio in accordance with a command from a user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a diagram showing an example of a screen for configuring bookbinding printing;

FIG. 15 is a diagram showing an example of a screen for configuring the details of bookbinding printing;

DESCRIPTION OF THE PREFERRED EMBODIMENTS

Preferred embodiments of the present invention will be described in detail in accordance with the accompanying drawings.

(First Embodiment)

A preferred embodiment for applying the present invention is applied will now be described. It should be noted, however, that the present invention is not limited to the following embodiment.

Figure 1:
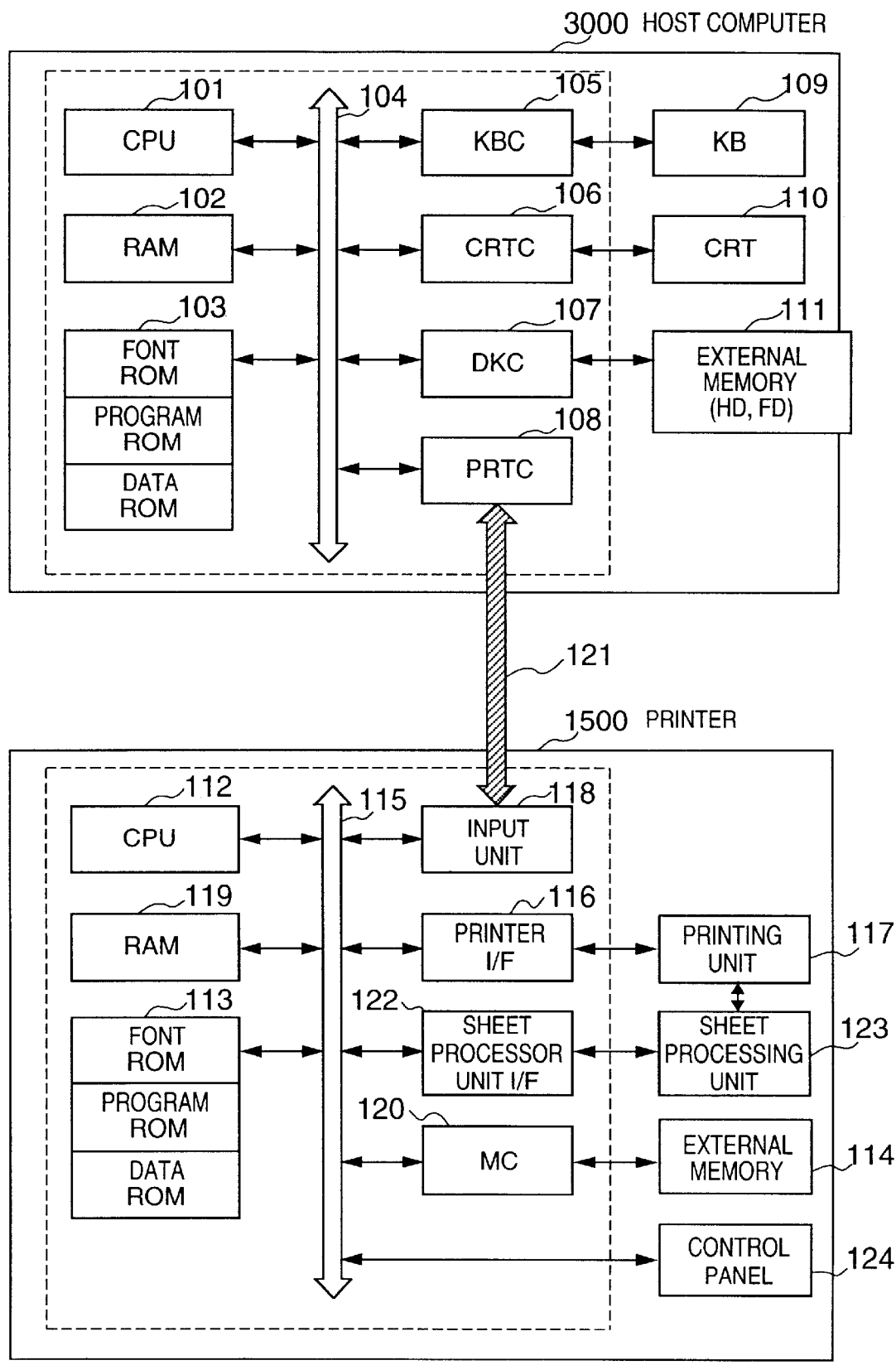
FIG. 1 is a block diagram useful in describing the configuration of a printing control system according to an embodiment of the present invention.

FIG. 1 is a block diagram useful in describing a printing control system which is one embodiment of the present invention. It should be noted that as long as the functions of the present invention are executed, the arrangement of the invention may be a stand-alone device, a system comprising a plurality of devices or a system in which processing is executed upon making a connection via a network such as a LAN or WAN.

The system shown in FIG. 1 includes an information processing apparatus (a host computer) 3000 having a CPU 101 which, on the basis of a programming ROM in a ROM 103 or a document processing program that has been stored in an external memory 111, executes the processing of a document containing mixed objects such as graphics, images, characters and tables (inclusive of spreadsheets, etc.). The CPU 101 performs overall control of various printing devices (printers) connected to a system bus 104.

An operating system, which is the control program of the CPU 101, is stored in a program ROM of the ROM 3 or in the external memory 111. Font data used when the above-mentioned document processing is executed is stored in a font ROM of the ROM 103 or in the external memory 111. Various data used when the above-mentioned document processing is executed is stored in a data ROM of the ROM 103 or in the external memory 111. The RAM 102 functions as the main memory and work area of the CPU 101.

A keyboard controller (KBC) 105 controls inputs from a keyboard 109 and pointing device, which is not shown. A CRT controller (CRTC) 106 controls the display on a CRT display (CRT) 110.

A disk controller (DKC) 107 controls access to the external memory 111, such as a hard disk (HD) or floppy disk (FD), which stores a booting program, various applications, font data, user files, edited files and a program (referred to as a "printer driver" below) for generating printer control commands.

A printer controller (PRTC) 108, which is connected to a printer 1500 via a bidirectional interface 121, executes processing for controlling communication with the printer 1500.

The CPU 101 executes processing to rasterize outline fonts in a RAM area, provided in, say, the RAM 102, that stores display information, and implements a WYSIWYG (What You See Is What You Get) function using the CRT 110.

Further, on the basis of commands designated by a mouse cursor (not shown) on the CRT 110, the CPU 101 opens various windows that have been registered and executes a variety of data processing. When printing is executed, the user opens a window relating to printing settings, sets the printer and sets a printing processing method in regard to the printer driver, the setting including the selection of a printing mode.

The printer 1500 is controlled by a CPU 112. On the basis of a control program or the like stored in a program ROM of a ROM 113 or a control program stored in an external memory 114, the CPU 112 outputs an image signal, which serves as output information, to a printing unit (printer engine) 117 connected to a system bus 115 via a printing control interface 116, and outputs a sheet processing signal, via a sheet processor interface 122, to a sheet processor 123, which executes sheet processing such as a saddle-stitching with regard to a sheet that has been output from the printing unit.

A control program of the CPU 112 is stored in a program ROM of the ROM 113. Font data used when the above-mentioned output information is generated is stored in a font ROM of the ROM 13. In case of a printer not equipped with the external memory 114 such as a hard disk, information utilized in the host computer is stored in a data ROM of the ROM 113.

The CPU 112, which can execute processing for communicating with the host computer via an input unit 118, is adapted so as to be capable of notifying the host computer 3000 of information internal to the printer 1500. A RAM 119, which functions as the main memory and work area of the CPU 112, is so adapted that memory capacity can be expanded by optional RAM connected to add-on memory, not shown. The RAM 119 is used as an area for expanding output information, as an area for storing environment data and as an NVRAM, etc. The external memory 114, such a hard disk (HD) or IC card, has its access controlled by a memory controller (MC) 120. The external memory 114, which is connected to the printer as an option, stores font data, an emulation program and form data, etc. Further, a control panel 124 has an array of operation switches and LED indicators.

The external memory 114 is not limited to a single memory and a plurality thereof may be provided. An arrangement may be adopted in which a plurality of optional cards storing optional fonts to supplement the internal fonts or a plurality of external memories storing programs for interpreting printer control languages of different language systems can be connected to the apparatus. Furthermore, the external memory 14 may have an NVRAM (not shown) for storing printer mode setting information from the control panel 1501.

Figure 2:
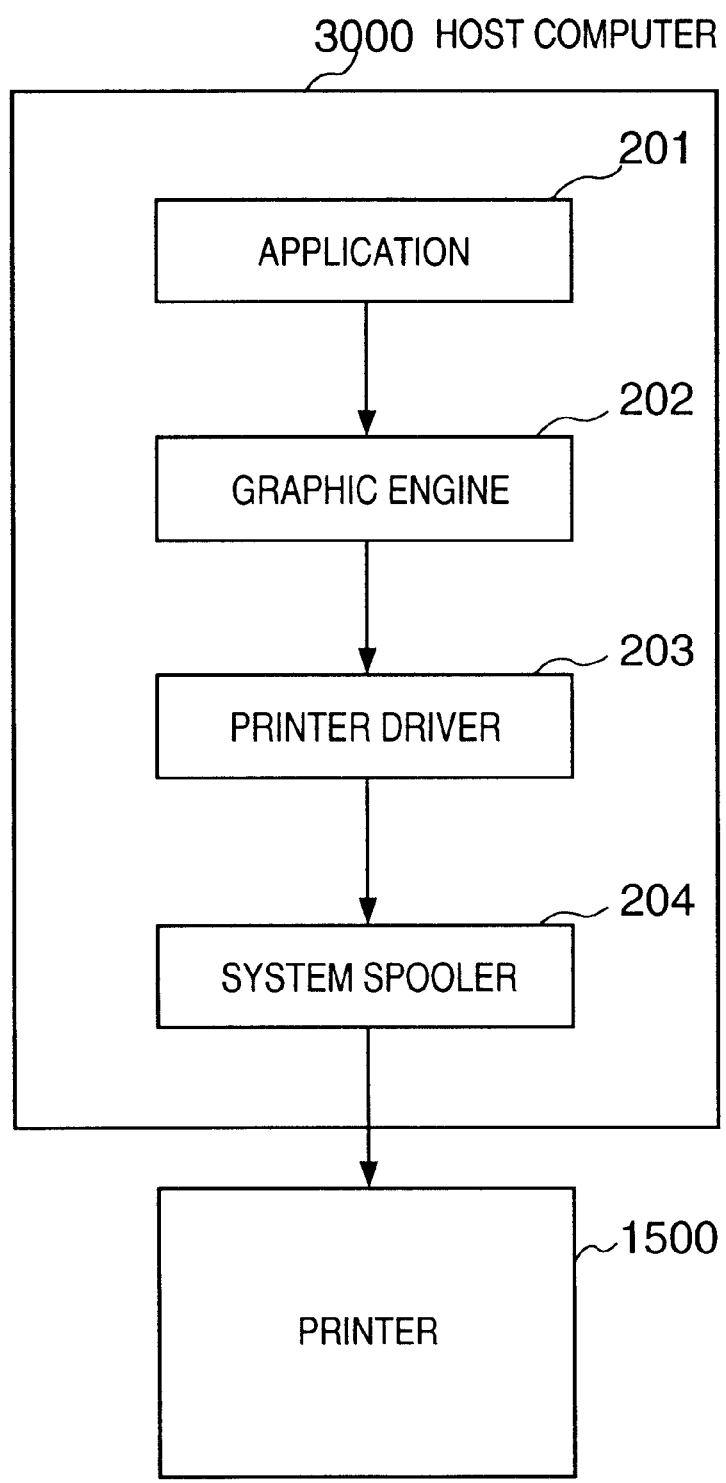
FIG. 2 is a block diagram illustrating the configuration of a typical printing system of a host computer to which a printer has been connected.

FIG. 2 is a diagram showing typical printing processing executed by the host computer connected to a printing apparatus directly or via a network.

An application 201, graphic engine 202, printer driver 203 and system spooler 204 are preserved in the external memory 11 as files. These are program modules which, when they are to be executed, are loaded in the RAM 2 and executed by the operating system and by modules which utilize these modules.

The application 201 and the printer driver 203 can be stored on a floppy disk or CD-ROM of the external memory 1 or can be stored on the hard disk of the external memory 111 via a network, not shown. The application 201 preserved in the external memory 11 is executed upon being loaded in the RAM 102. When the application 201 performs printing using the printer 1500, output (plotting) is performed utilizing the graphic engine 202 which, similarly, can be executed upon being loaded in the RAM 102.

The graphic engine 202 loads the printer driver 203, which is prepared for each printing apparatus, from the external memory 111 to the RAM 102 and sets the output from the application 201 in the printer driver 203. The graphic engine 202 makes a conversion from a GDI (Graphic Device Interface) function received from the application 201 to a DDI (Device Driver Interface) function and outputs the DDI function to the printer driver 203. Based upon the DDI function received from the graphic engine 202, the printer driver 203 effects a conversion to a control program capable of being recognized by the printer, e.g., to PDL (Page Description Language). The printer control commands obtained by the conversion are output to the printer 1500 as print data via the interface 121 by way of the system spooler 204 that has been loaded into the RAM 102 by the operating system.

Figure 3:
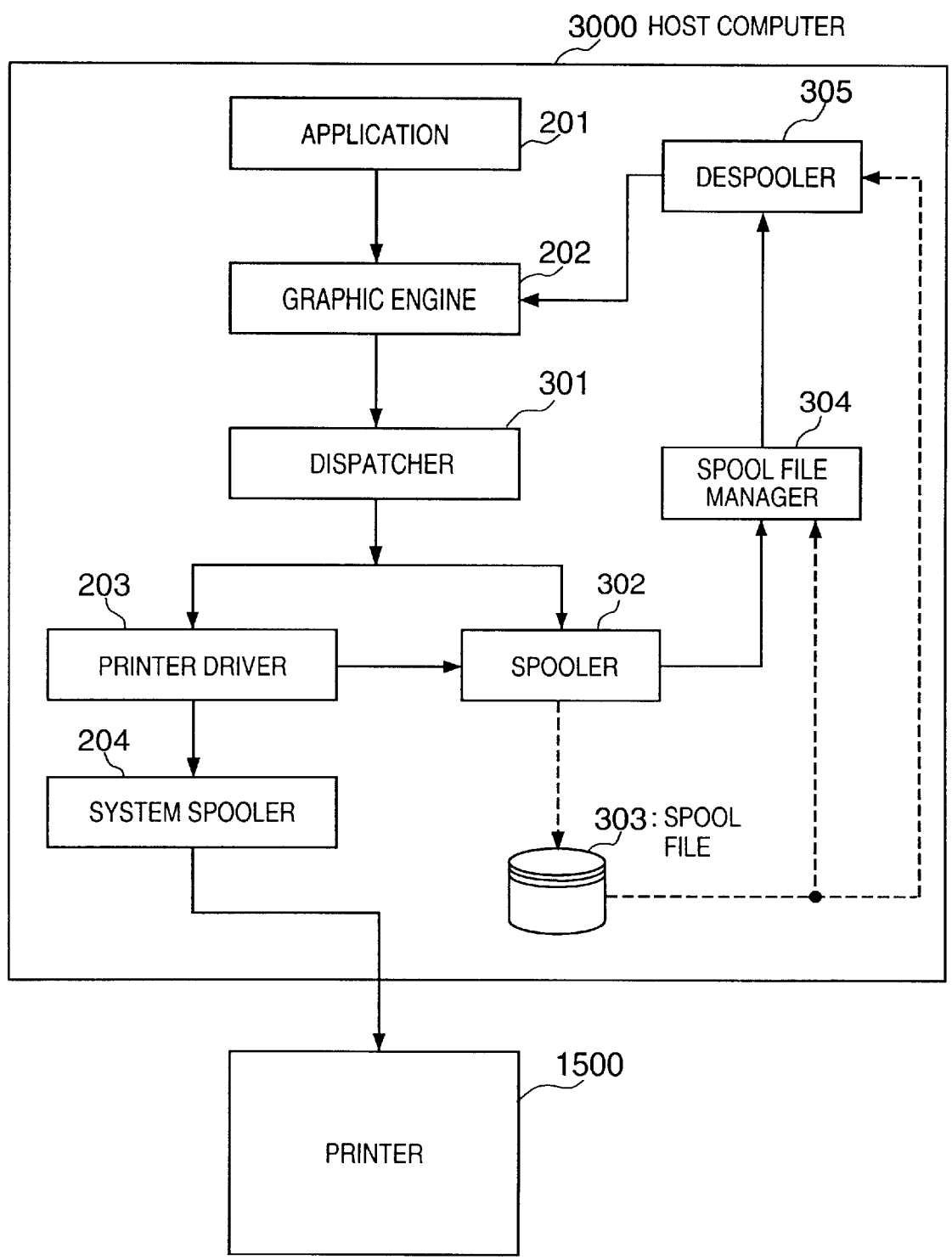
FIG. 3 is a block diagram illustrating the configuration of a printing control system in which a printing command from an application is spooled temporarily as intermediate code.

The printing system according to this embodiment of the present invention is obtained by additionally providing the system comprising the printer and host computer shown in FIG. 2 with components for spooling print data from the application temporarily as intermediate code data, as shown in FIG. 3.

<System Configuration>

FIG. 3 is an expansion of the system of FIG. 2. Here a spool file 303 comprising intermediate codes is generated temporarily when a DDI function is sent from the graphic engine 202 to the printer driver 203. In the system of FIG. 2, the application 201 is freed from printing processing at the moment the printer driver 203 finishes converting all DDI functions from the graphic engine 202 to printer control commands. In the system of FIG. 3, on the other hand, a spooler 302 converts all DDI functions to intermediate code data and outputs the code data to a spool file 303. Ordinarily the latter requires a shorter period of time.

Further, in the system shown in FIG. 3, the content of the spool file 303 can be manipulated. As a result, it is possible to realize functions not possessed by the application. For example, the print data from the application can be subjected to size enlargement and reduction, printed upon reducing a plurality of pages to the size of a single page, and subjected to bookbinding printing in accordance with the present invention.

In order to make it possible to manipulate the print data in various ways and print the data in a variety of forms, the former system of FIG. 2 is expanded a shown in FIG. 3 in such a manner that print data is spooled in the form of intermediate codes.

In order to manipulate the print data, the operator usually makes settings using a window provided by the printer driver 203 and the printer driver 203 saves the set content in the RAM 102 or external memory 111.

<Data Processing>

The details of FIG. 3 will now be described. As illustrated in FIG. 3, the processing scheme thus expanded is such that the DDI function from the graphic engine 202 is accepted by a dispatcher 301. In a case where a DDI function that the dispatcher 301 has accepted from the graphic engine 202 is a DDI function that the application 201 issued to the graphic engine 202, the dispatcher 301 loads the spooler 302, which has been stored in the external memory 111, into the RAM 2 and sends the DDI function to the spooler 302 and not to the printer driver 203.

The spooler 302 converts the accepted DDI function to an intermediate code and outputs the code to a spool file 303. Further, the spooler 302 acquires the manipulation settings, which relate to print data set in the printer driver 203, from the printer driver 203 and preserves the data in the spool file 303. Though the spool file 303 is generated as a file in the external memory 111, the file may be generated in the RAM 102. Furthermore, the spooler 302 loads a spool file manager 304, which has been stored in the external memory 111, into the RAM 102 and notifies the spool file manager 304 of the status of spool file generation. In accordance with the content of the manipulation settings relating to the print data preserved in the spool file 303, the spool file manager 304 subsequently determines whether printing can be performed.

When the spool file manager 304 has judged that printing can be performed utilizing the graphic engine 202, the spool file manager 304 loads a despooler 305, which has been stored in the external memory 111, into the RAM 102 and instructs the despooler 305 to perform printing of the intermediate codes described in the spool file 303.

In accordance with the content of manipulation settings included in the spool file 303, the despooler 305 manipulates the intermediate code contained in the spool file 303 and converts the code to a GDI function. The graphic engine 202 makes the conversion from the GDI function to the DDI functions and outputs the same.

In a case where a DDI function which the dispatcher 301 has received from the graphic engine 202 is a DDI function obtained by converting a GDI function sent from the despooler 305 to the graphic engine 202, the dispatcher 301 sends the DDI function to the printer driver 203 and not to the spooler 302.

The printer driver 203 generates a printer control command (PDL, etc.) and outputs the command to the printer 1500 via the system spooler 204.

Thus, with the printing processing system of FIG. 3, after a print job temporarily converted to intermediate code is converted to a GDI function by the despooler 305, it is returned to the graphic engine. Accordingly, an advantage of the printing processing system of FIG. 3 is that the components from 301 to 305 need not be changed for every printer driver.

<Bookbinding Printing>

Figure 4:
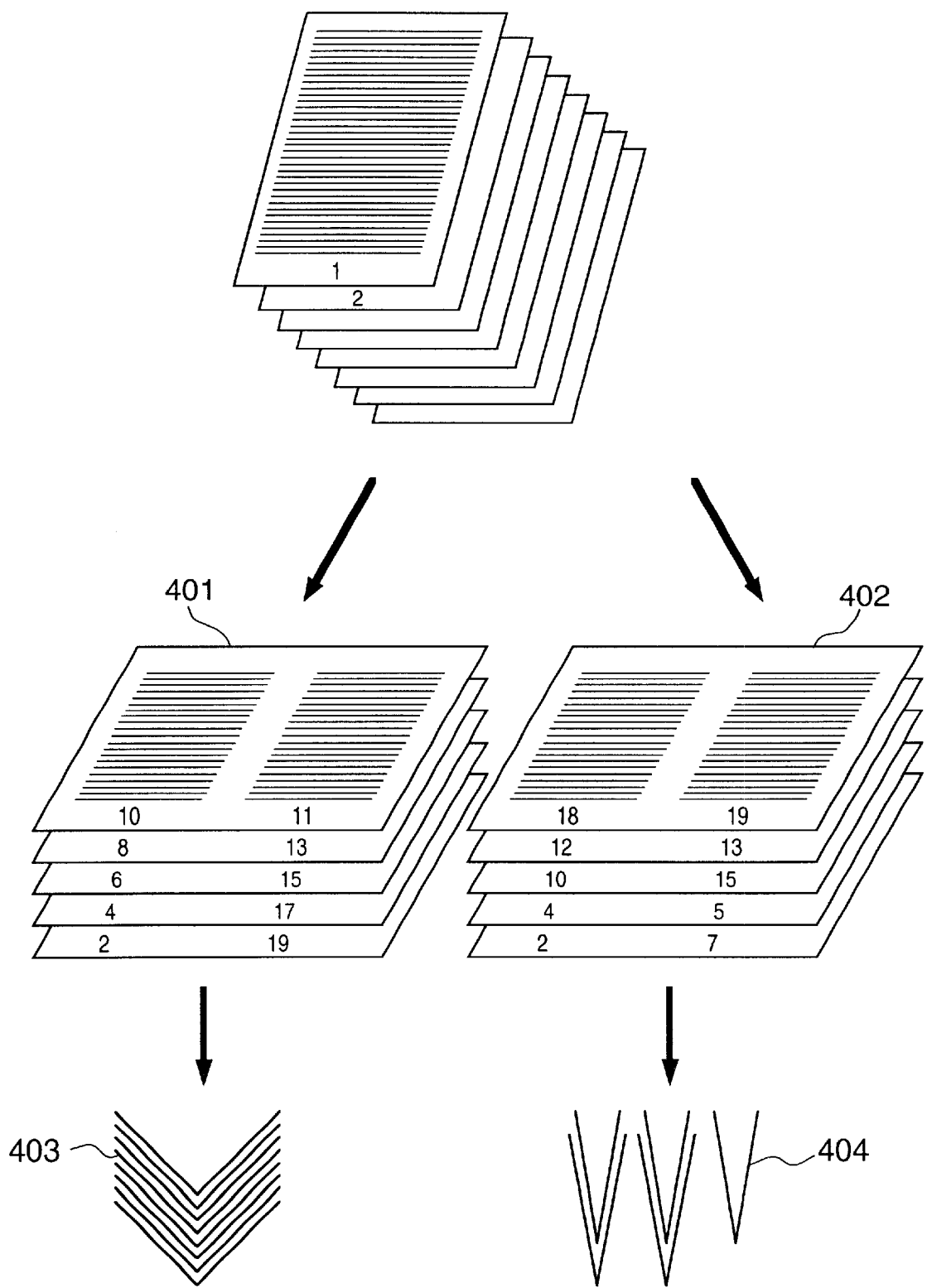
FIG. 4 is a diagram useful in describing the format of bookbinding printing.

FIG. 4 illustrates an example useful in describing bookbinding printing as well as the results of implementing the same. In bookbinding printing, printing is performed on both sides of paper to rearrange page order so that the pages will be in numerical order when the printouts are folded in half. Printing may be performed in the formats indicated at 401 and 402 in FIG. 4.

If the bookbinding printouts 401, 402 are folded in half by some method as shown at 403, 404, the pages will take on the correct numerical order.

There are two methods of achieving bookbinding printing, namely a method of printing in which a block of sheets for bookbinding is obtained from all pages to be printed, and a method of printing in which any specified number of sheets is adopted as a block of sheets for bookbinding. The bookbinding block mentioned here represents how many sheets of paper that have been output by bookbinding printing are to be collected together and folded at a time. In case of the method of printing in which a block of sheets for bookbinding is obtained from all pages to be printed, an output such as printed matter 401 in FIG. 4 is obtained. These sheets are folded in half collectively to form a book. In case of the method of printing in which any specified number of sheets is adopted as a block of pages for bookbinding, an output such as printed matter 402 in FIG. 4 is obtained. These sheets are folded in half block by block and are then combined to form the book.

Figure 5:
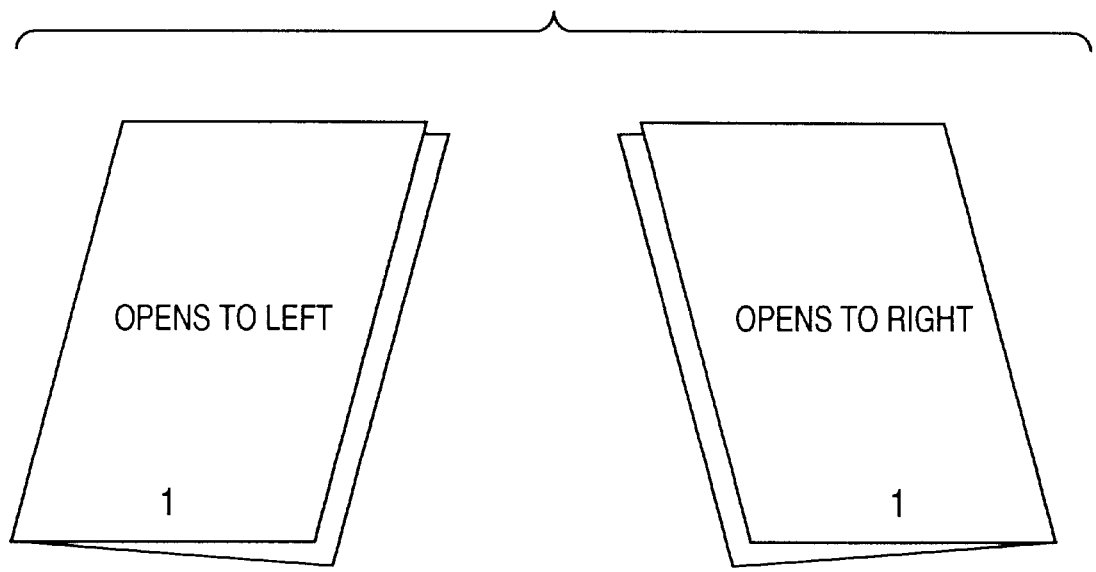
FIG. 5 is a diagram useful in describing opening directions in bookbinding.

Further, as shown in FIG. 5, bookbinding formats output by bookbinding printing also include a case in which pages are arranged in ascending order from the left (the book opens to the left), and a case in which pages are arranged in ascending order from the right (the book opens to the right).

In a case where pages to be printed are turned sideways, the pages are merely rotated and the order of the pages is not changed. These settings can be specified from the configuring screens shown in FIGS. 14 and 15, which are described below.

<Description of Settings Screen>

FIG. 14 illustrates an example of a screen for configuring bookbinding printing. The settings screen is displayed by the printer driver 202 and is used to make the necessary assignments. FIG. 15 illustrates an example of a screen for setting the direction in which the book opens and the block of sheets for bookbinding.

Figure 16:
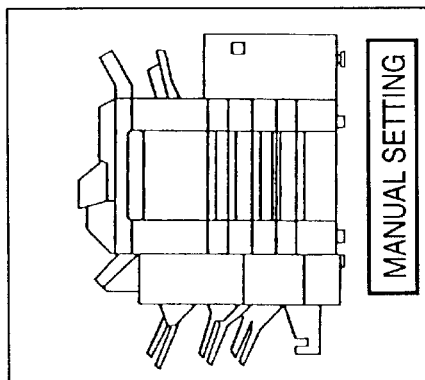
FIG. 16 is a diagram showing an example of a screen for designating whether to use the function of a printing device or the function of a host internally.

FIG. 16 illustrates an example of a screen for designating whether to use the function of a printing device or the function of a host internally. Internal processing can be selected in an area 1601. An arrangement may be adopted in which a selection is made among the three choices "AUTOMATIC", "ALWAYS EXECUTE PROCESSING ON HOST SIDE" and "DISABLE PROCESSING ON HOST SIDE", as in this embodiment, or in which use is made of a user interface for allocating processing by a slide-bar arrangement.

In this embodiment, it is assumed that when "AUTOMATIC" has been selected, the functions of the printing device and host are decided internally in dependence upon the settings. Further, it is assumed that the host function is used if "ALWAYS EXECUTE PROCESSING ON HOST SIDE" is selected and that the function of the printing device is used if "DISABLE PROCESSING ON HOST SIDE" is selected.

<Flow of Bookbinding Printing Processing>

Figure 6:
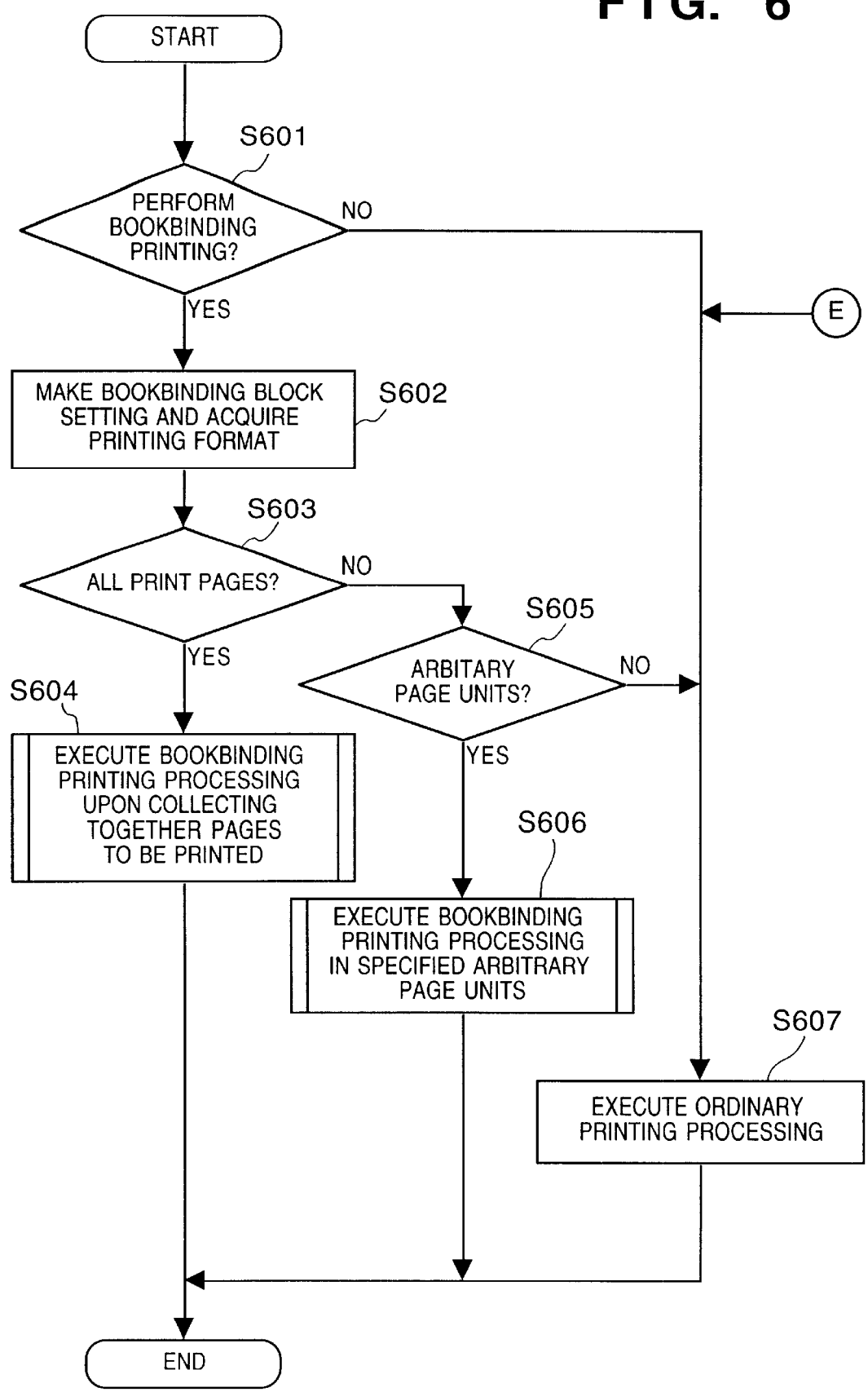
FIG. 6 is a flowchart illustrating processing for bookbinding printing according to this embodiment of the present invention.

FIG. 6 is a flowchart illustrating the flow of processing according to this embodiment.

If the user has made a bookbinding printing setting at step 601, control proceeds to step 602. If the decision at step 601 is "NO", then control proceeds to step 607, at which ordinary printing is carried out.

A setting relating to the bookbinding printing block and a setting relating to the printing format is acquired at step 602.

The following selections are available for block settings:
1. Bookbinding printing in which a block of sheets for bookbinding is obtained from all pages to be printed
2. Bookbinding printing in which any specified number of sheets is adopted as a block of sheets for bookbinding Further, the following selections are available as printing format settings:
1. Book opens to the left
2. Book opens to the right If all pages have been selected as a bookbinding printing block at step 603, control proceeds to step 604; otherwise, control proceeds to step 605.

Bookbinding printing in which a block of sheets for bookbinding is obtained from all pages is performed at step 604. The details of this processing will be described later.

If a specific number of pages has been selected as the bookbinding printing block at step 605, control proceeds to step 606; otherwise, control proceeds to step 607.

Bookbinding printing is performed at step 606 in accordance with the block setting specified. The details of this processing will be described later.

Ordinary print processing is executed at step 607.

It should be noted that the bookbinding printing and block settings are made on the basis of inputs by the operator using the host computer 3000.

The processing relating to step 604 in FIG. 6 (bookbinding printing in which a block of sheets for bookbinding is obtained from all pages to be printed) will be described in detail using FIGS. 7 and 8.

Figure 7:
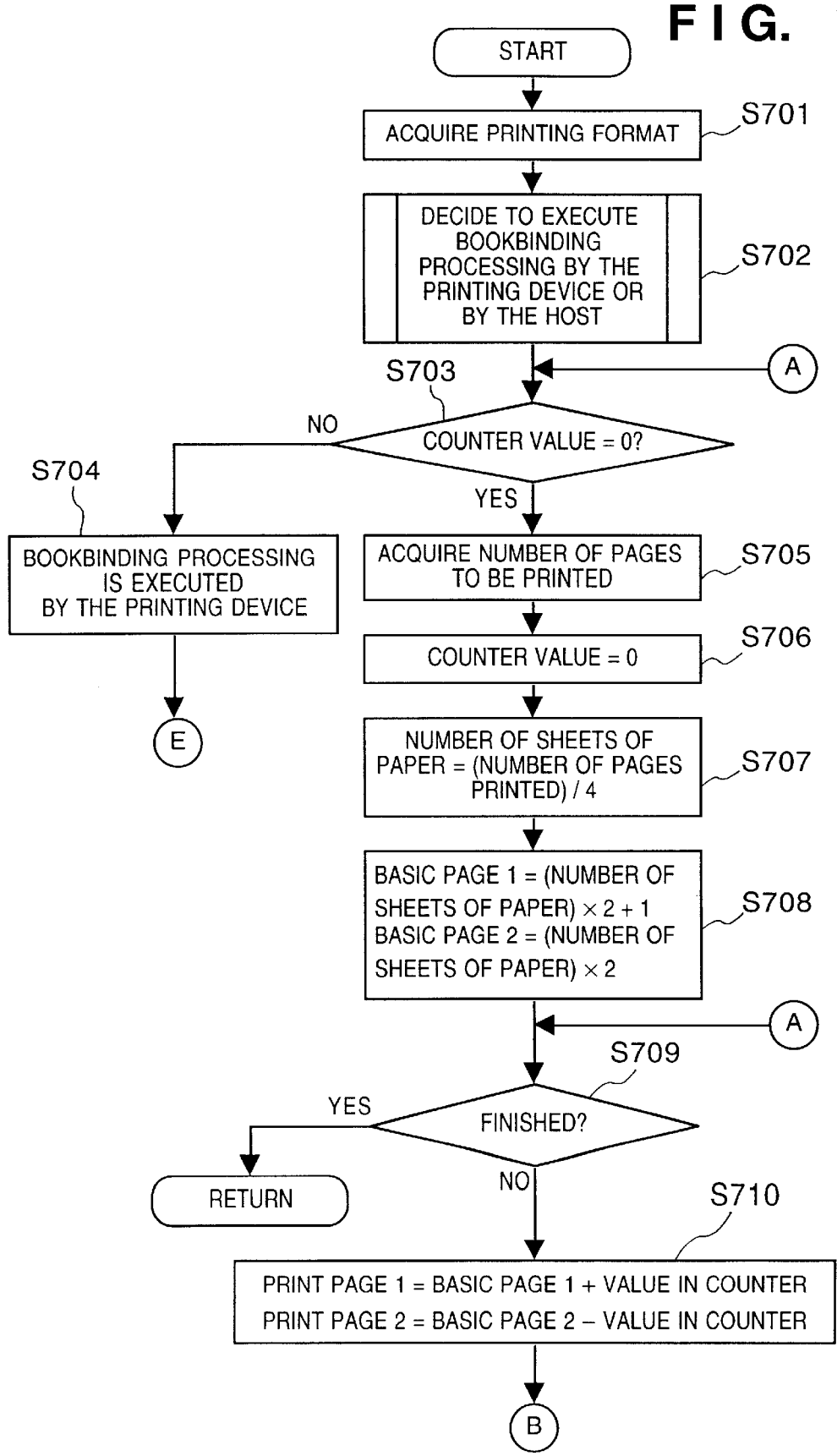
FIG. 7 is a flowchart illustrating processing for bookbinding printing in which all pages are bound.

The printing format is acquired at step 701 in FIG. 7.

This is followed by step 702, at which it is decided to execute bookbinding processing by the printing device or by the host. The method of making this decision will be described later. Whether bookbinding processing is to be executed by the printing device or by the host is discriminated at step S703. If processing is to be executed by the printing device ("NO" at step 703), control proceeds to step S704, at which printing is configured in such a manner that bookbinding printing will be performed by the printing device. Control then proceeds to step 607 in FIG. 6, where ordinary print processing is executed by the host.

In a case where bookbinding printing is performed by the host, control proceeds to step S705.

The number of pages to be printed is acquired at step S705. It is possible to acquire these pages at the moment all print data from the application is finished being spooled.

A bookbinding printing incrementing counter is set to zero at step 706. When the count in this counter is an even number, printing is performed in such a manner that the page to be printed will be on the inside when it is incorporated. When the count in this counter is an odd number, printing is performed in such a manner that the page to be printed will be on the outside when it is incorporated. (Since the count in the incrementing counter will be zero for the page printed first, this page is on the inside.)

Next, at step 707, the number of sheets of paper used is computed in accordance with the following equation:

number of sheets of paper=(number of pages)/4 (fractions below the decimal point are rounded up)

Next, at step 708, the page numbers of two pages to be printed on the inside of paper that will be innermost when the paper has been folded in half is computed using the equations below. The pages that will be printed following these two pages are calculated on the basis of these two pages.

basic page 1=(number of sheets of paper)×2+1 basic page 2=(number of sheets of paper)×2

For example, assume that 50 pages of print data have been sent from the application. The number of sheets of paper used in bookbinding printing in this case will 50÷4=13 (fractions below the decimal point are rounded up). The basic pages printed on the paper incorporated when the sheets of paper are folded in half are as follows: basic page 1=13×2+1=page 27, basic page 2=13×2=page 26. In the example of FIG. 4, the 11th page and the 10th page, which constitute the side of the sheet incorporated innermost of the printed matter 401 when the sheets are folded, correspond to these basic pages.

When it is found at step 709 that bookbinding printing has been completed, processing is terminated. If it is found at step 709 that bookbinding printing has not been completed, then control proceeds to step 710. Specifically, if the count in the incrementing counter is equal to (number of sheets of paper)×2, then processing ends.

Two pages to be printed side by side on one side of the printing paper are computed at step 710 in accordance with the following equations:

print page 1=basic page 1+value in counter print page 2=basic page 2−value in counter For example, in a case where 50 pages are to be printed and bound, the pages included on the second printed page are 27+1=page 28 and 26−1=page 25.

Whenever the counter is subsequently incremented, the pages become page 29 and 24, pages 30 and 23, . . . and so on.

Since the value in the counter is initially zero, the basic pages constitute the first printed page.

Figure 8:
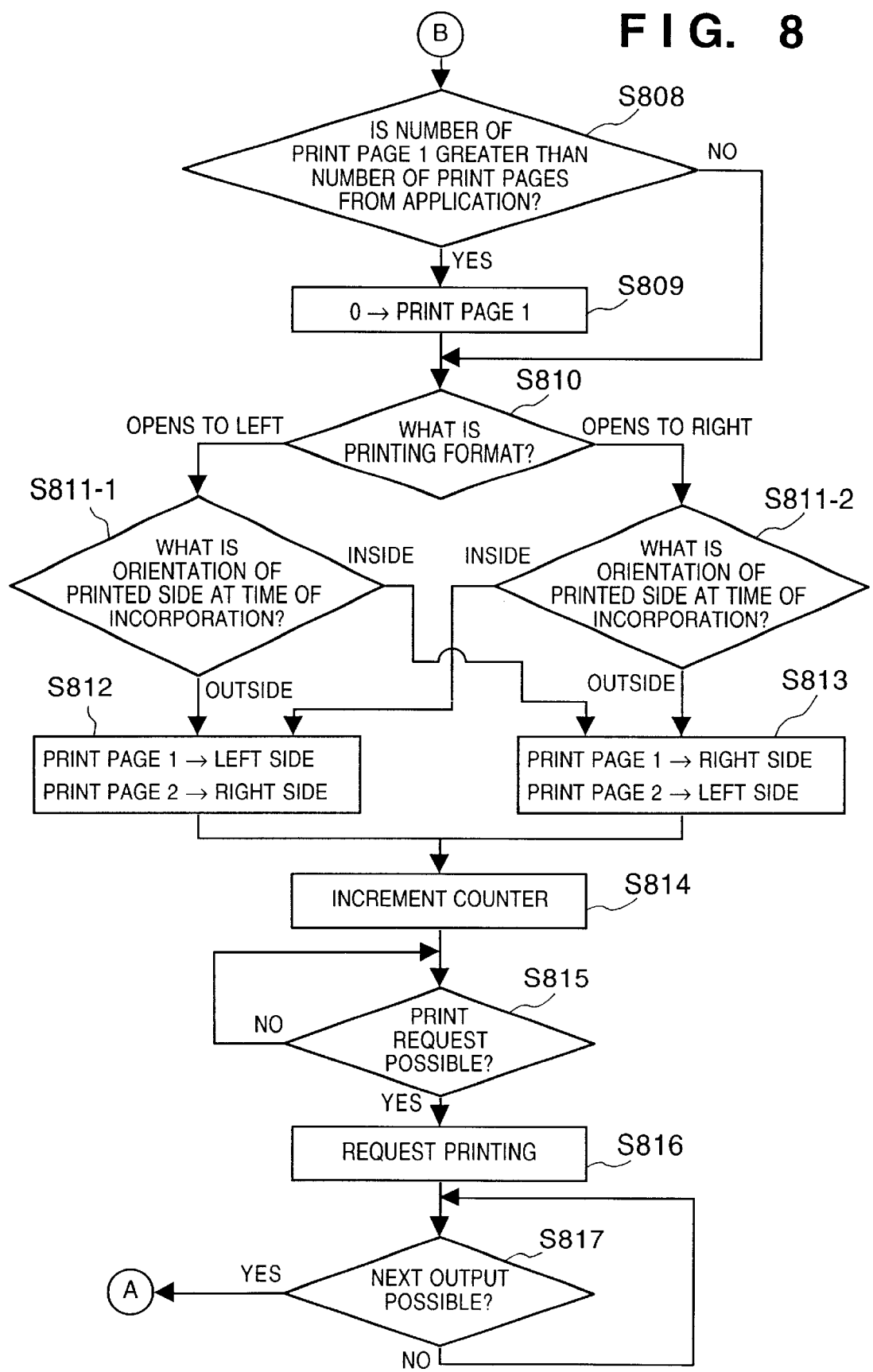
FIG. 8 is a flowchart illustrating processing for bookbinding printing in which all pages are bound.

With reference to the flowchart of FIG. 8, it is determined at step 808 whether the print page 1 calculated has a page number greater than the number of print pages from the application. If the answer is "YES", the print page 1 is treated as a blank space and control proceeds to step 809. If the answer at step 808 is "NO", then control skips to step 810.

Since the print page 1 will constitute a blank space at step 809, here page number 0, for example, which represents a blank space, is substituted for print page 1.

This is followed by step 810 and either step 811-1 or 811-2, which decide the layout of two pages calculated based upon the bookbinding format (whether the book opens to the left or opens to the right) and the value in the counter (whether placement is on the inside or outside when the sheets are folded into book form).

More specifically, in regard to the inside/outside decision, placement is judged to be on the inside if the value in the counter (the number of print requests issued thus far) is even and on the outside if the value in the counter is odd. Since the number of printing requests issued will be zero (the count in the incrementing counter will be zero) for the very first printed page, this page is judged to be on the inside. From this point onward, the judgment made alternates as follows: outside, inside, outside . . . and so on. Processing proceeds as follows as the result of the decisions rendered at steps 810, 811-1, 811-2:

to step 813 if the book opens to the left and the page is on the inside at incorporation;

to step 812 if the book opens to the left and the page is on the outside at incorporation;

to step 813 if the book opens to the right and the page is on the inside at incorporation; and to step 812 if the book opens to the right and the page is on the outside at incorporation.

Print page 1 is placed on the left side and print page 2 on the right side at step 812.

Print page 1 is placed on the right side and print page 2 on the left side at step 813.

The processing from step 810 to step 813 prints page 25 on the reverse side of page 26 and page 28 on the reverse side of page 27, by way of example.

The counter is incremented by one at step 814.

It is determined at step 815 whether a subsequent print request is possible in regard to the despooler 305. Control proceeds to step 816 if the request is possible. If the request is not possible, then the apparatus waits until the next print request becomes possible.

A request to print one side of a sheet of printing paper is issued at step 816 in regard to a print page whose layout has been completed.

This is followed by step 817, at which it is determined whether a request for output of the next page is possible. Control proceeds to step 706 (FIG. 7) if the request is possible. If the request is not possible, the system waits until it is possible. The printed matter thus printed and output need only be folded in half in the stacked state to accomplish binding.

Figure 12:
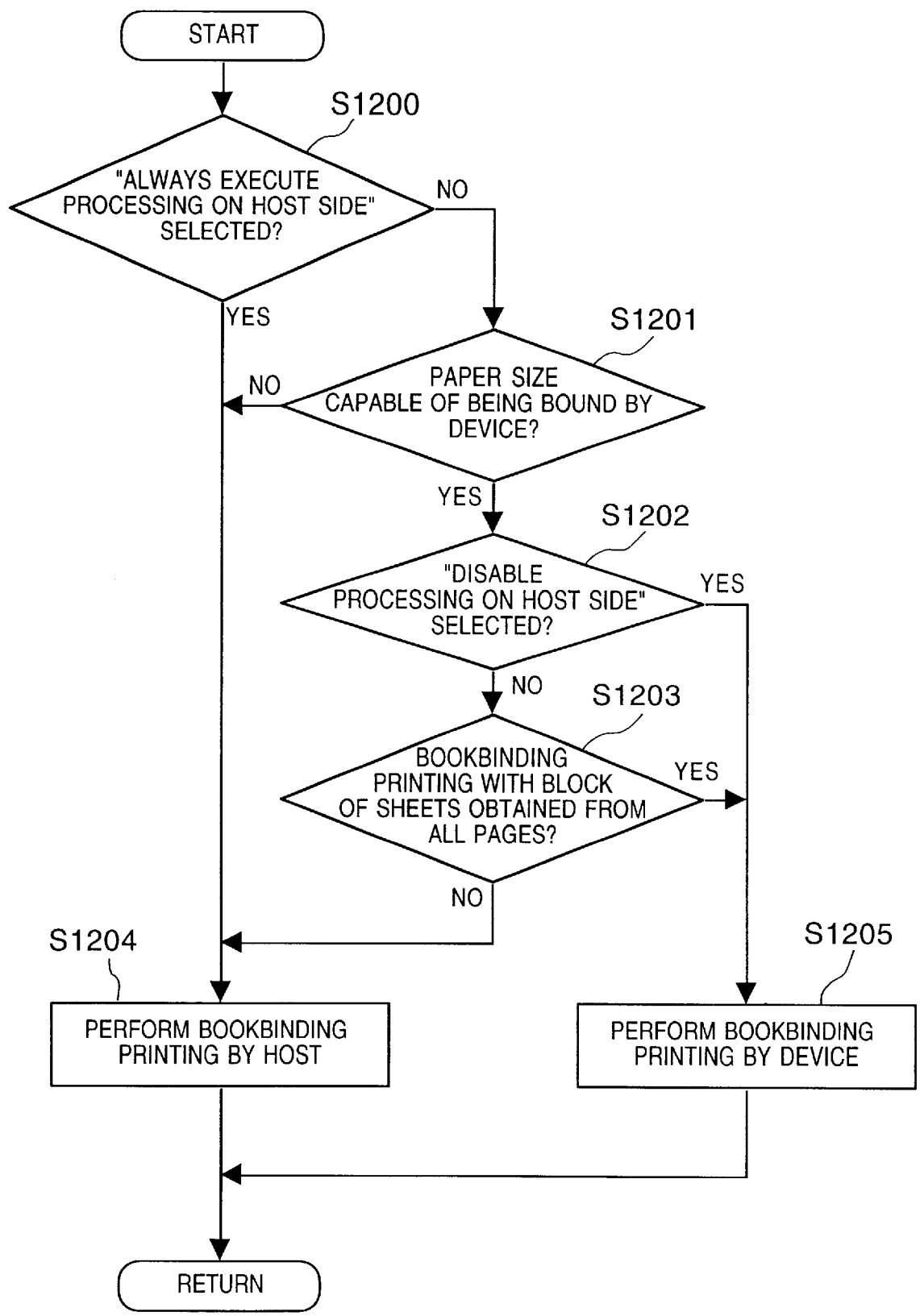
FIG. 12 is a flowchart useful in describing processing for determining whether bookbinding printing is to be performed by a printing device or by a host in a first embodiment.

FIG. 12 is a flowchart illustrating processing for determining whether bookbinding printing is to be performed by a printing device or by a host.

If it is found at step 1200 that "ALWAYS EXECUTE PROCESSING ON HOST SIDE" has been designated in the internal spool processing area shown in FIG. 16, control proceeds to step 1204, at which bookbinding printing is performed by the host. Control then returns. If "ALWAYS EXECUTE PROCESSING ON HOST SIDE" has not been designated, control proceeds to step 1201.

If it is found at step 1201 that a paper size capable of being subjected to bookbinding printing by the printing device has not been specified, control proceeds to step 1204. Here bookbinding printing is performed by the host and control then returns.

If it is found at step 1202 that "DISABLE PROCESSING ON HOST SIDE" has been designated, control proceeds to step 1205. Here bookbinding printing is performed by the printing device and control then returns.

Since "AUTOMATIC" has been selected, the format of bookbinding printing is examined at step 1203. If a block of sheets for bookbinding is obtained from all pages to be printed, control proceeds to step 1205; otherwise, bookbinding printing is such that any specified number of sheets is adopted as a block of sheets for bookbinding and, hence, control proceeds to step 1204.

This embodiment is such that if "AUTOMATIC" has been selected as internal spool processing, processing switches between processing by the printing device and processing by the host depending upon the bookbinding printing format. However, the switch in processing may be performed in accordance with some other criterion, such as the memory capacity with which the printing device is provided.

Processing relating to step 606 (bookbinding printing in which any specified number of sheets serves as the block for bookbinding) in FIG. 6 will now be described in detail with reference to FIGS. 9 and 10.

The "block" referred to here indicates how many sheets are incorporated at a time when bookbinding printing is performed. For example, in a case where 40 pages of print data from the application are printed in units of two sheets at a time, two sheets of paper folded in half serve as one block and eight pages of data are placed in one block. Accordingly, bookbinding printing is carried out by dividing all of the print data into five blocks.

The printing format and the number of sheets in one block are acquired at step 901.

The page that completes printing is set to zero at step 902.

This is followed by step 903, at which it is determined whether bookbinding printing processing is finished. If the answer is "YES", processing is terminated. If the answer is "NO", then control proceeds to step 904.

The print page at which bookbinding printing processing becomes possible is acquired at step 904. (This page shall be referred to as the "bookbinding printing enabling page.") The bookbinding printing enabling page obtained at step 904 is the last page in the block. The bookbinding printing enabling page in the initial block is obtained as follows:

bookbinding printing enabling page=(number of sheets per block)×4

In regard to the blocks from the second onward, the bookbinding printing enabling page is obtained as follows:

bookbinding printing enabling page=(bookbinding printing enabling page of preceding block)+(number of sheets per block)×4

For example, in a case where 40 pages are printed with one block being equal to two sheets, the bookbinding printing enabling page in the initial block will be 2×4=page 8 and the bookbinding printing enabling page in the next block will be 8+2×4=page 16. This will be followed by page 24, page 32 and page 40.

The number of pages for which spooling has been completed in the spooler 303 is acquired at step 905.

This is followed by step 906, at which it is determined whether spooling has been completed up to the print page (the bookbinding printing enabling page) at which bookbinding printing processing becomes possible or whether the spooling of all pages has been completed. Control proceeds to step 907 if processing is possible and returns to step 905 if processing is not possible.

The counter is set to zero at step 907.

This is followed by step 908, at which two basic pages to be printed on the inside of a sheet of paper that will be innermost when the paper has been folded in half are computed using the following equations:

basic page 1=bookbinding printing enabling page−(number of sheets per block)×2+1 basic page 2=bookbinding printing enabling page−(number of sheets per block)×2

It is determined at step 809 whether the request to print the current block has ended. Control proceeds to step 903 if the answer is "YES" and to step 910 if the answer is "NO". More specifically, it is judged that the printing request is completed if the value of the count in the counter has become equal to (number of sheets per block)×2.

This is followed by step 910, at which two pages for which printing is to be requested are computed in accordance with the following equations:

print page 1=basic page 1+value in counter print page 2=basic page 2−value in counter Since the value in the counter is initially zero, the basic pages 1, 2 constitute the first printed page.

Figure 10:
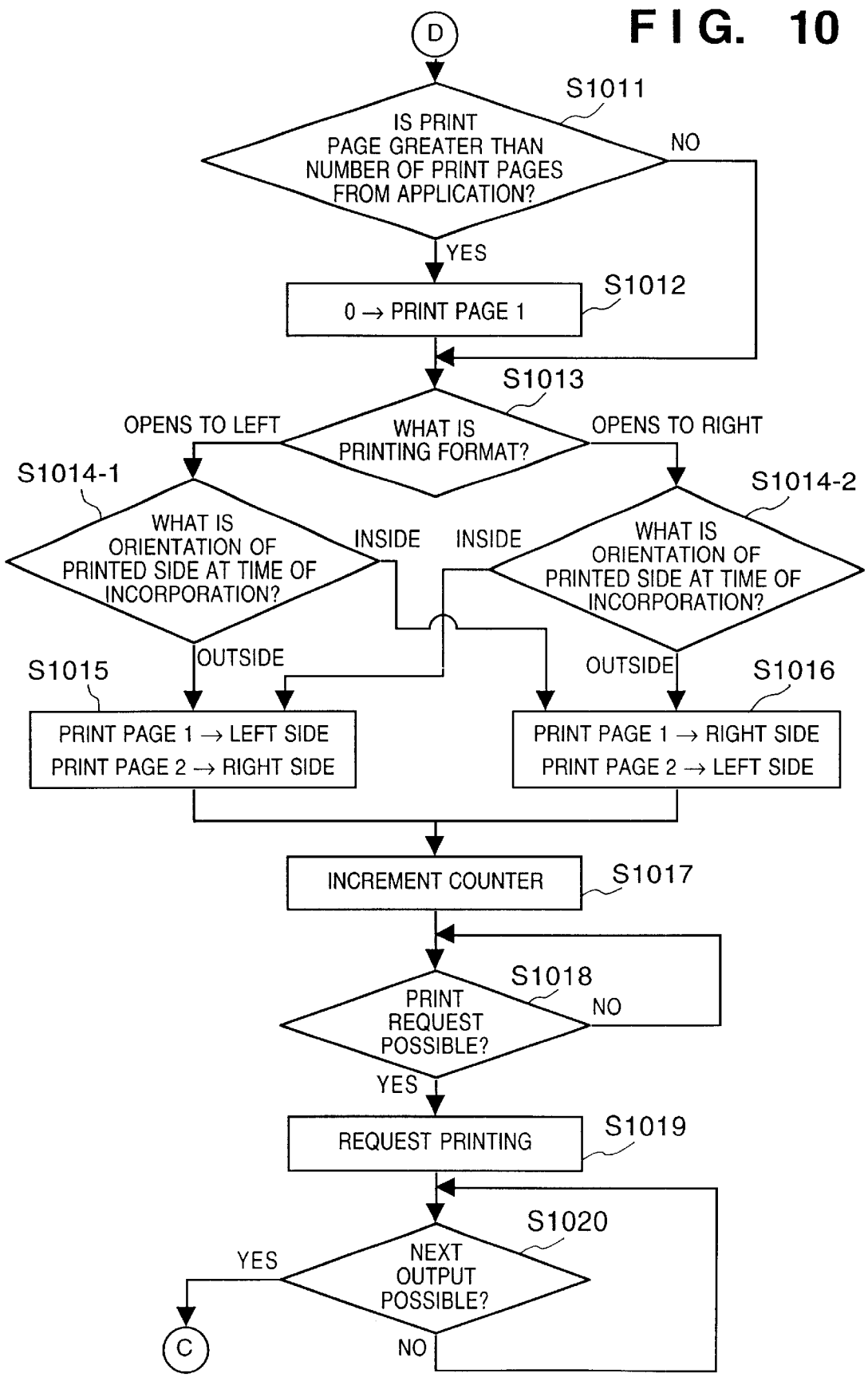
FIG. 10 is a flowchart illustrating processing for bookbinding printing in which a specified number of pages are bound.

This is followed by step 1011 in FIG. 10, at which it is determined whether the calculated print page 1 or print page 2 is greater than the number of print pages from the application. The print page 1 or print page 2 that is greater is treated as a blank space and control proceeds to step 1012. If the print pages are not greater, then control skips to step 813.

A blank space is placed for the print page at step 1012. Accordingly, page number 0, for example, which represents a blank space, is substituted.

This is followed by step 1013 and either step 1014-1 or 1014-2, which decide the layout of two pages (whether placement is on the inside or outside when the sheets are folded into book form) calculated based upon the bookbinding format (whether the book opens to the left or opens to the right) and the value in the counter.

More specifically, placement is judged to be on the inside if the value in the counter (the number of print request issued) is even and on the outside if the value in the counter is odd. Processing proceeds as follows:

to step 1016 if the book opens to the left and the page is on the inside at incorporation;

to step 1015 if the book opens to the left and the page is on the outside at incorporation;

to step 1016 if the book opens to the right and the page is on the outside at incorporation; and to step 1015 if the book opens to the right and the page is on the inside at incorporation.

Print page 1 is placed on the left side and print page 2 on the right side at step 1015.

Print page 1 is placed on the right side and print page 2 on the left side at step 1016.

The counter is incremented by one at step 1017.

It is determined at step 1018 whether a subsequent print request is possible. Control proceeds to step 1019 if the request is possible. If the print request is not possible, then the apparatus waits until the next print request becomes possible.

A request to print one side of a sheet printing paper is issued at step 1019 in regard to a print page whose layout has been completed.

This is followed by step 1020, at which it is determined whether a request for output of the next page is possible. Control proceeds to step 909 (FIG. 9) if the request is possible. If the request is not possible, the system waits until it is possible.

If double-sided printing by the printer 1500 is performed in response to a print request issued through the foregoing procedure, the sheets obtained as the printout need only be folded in half every desired block and combined to create printed matter bound in the form of a book.

Further, consider the case where all pages from an application have been spooled and then printed and bound on a block-by-block basis. If the number of pages to be printed in the final block is small in this case, bookbinding printing processing is executed so that a number of sheets smaller than the specified number will serve as one block. This is executed only in regard to the final block. This makes it possible to reduce the amount of paper used.

For example, in a case where the number of sheets per block is two and the number of remaining pages is three, five pages will be blank. However, if the number of sheets per block is changed to one, then only one page will be blank and the number of sheets of paper used can be reduced by one.

<Processing for Adjusting Number of Sheets>

Processing for adjusting the number of sheets in the final block will be described in detail with reference to FIG. 11.

Figure 9:
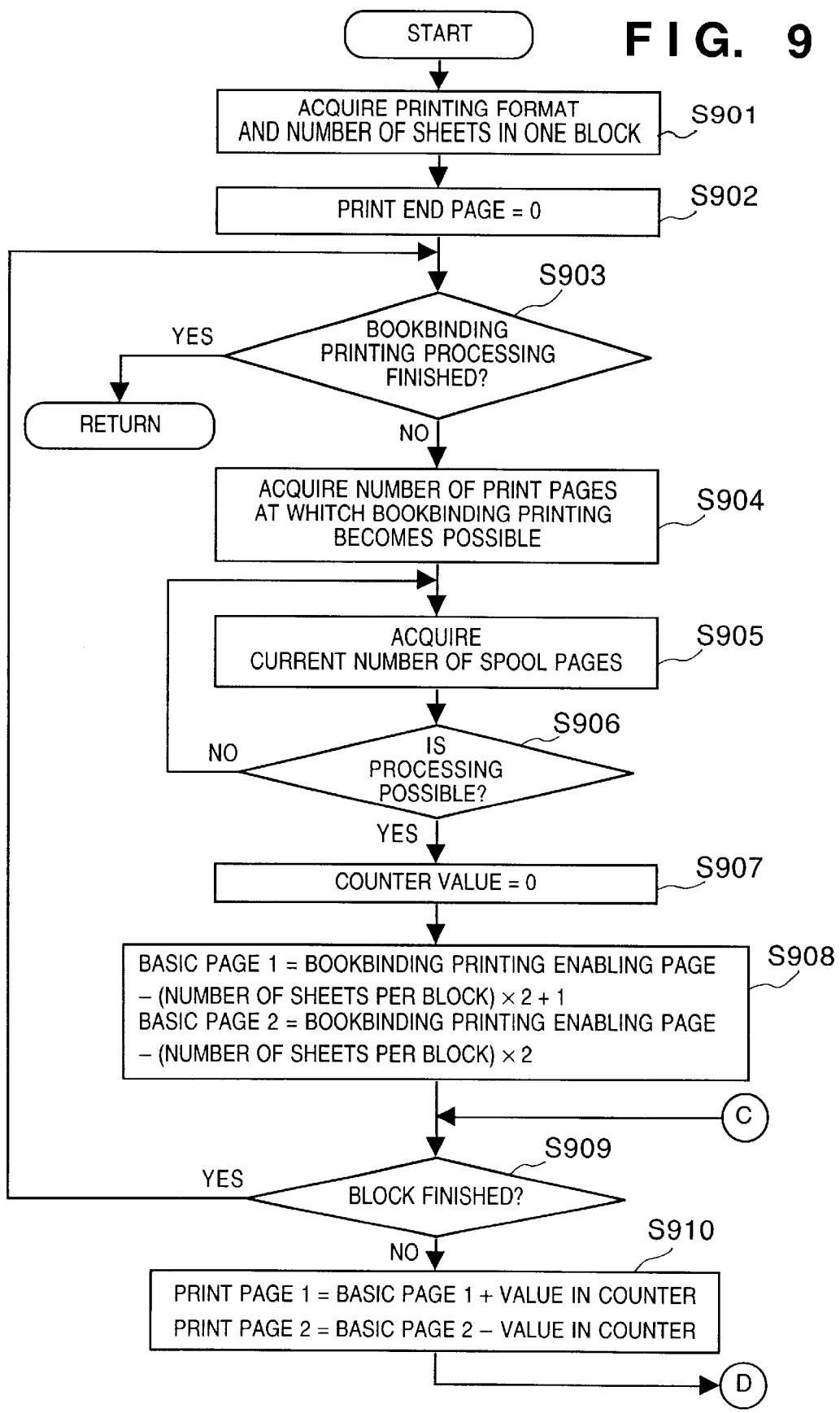
FIG. 9 is a flowchart illustrating processing for bookbinding printing in which a specified number of pages are bound.
Figure 11:
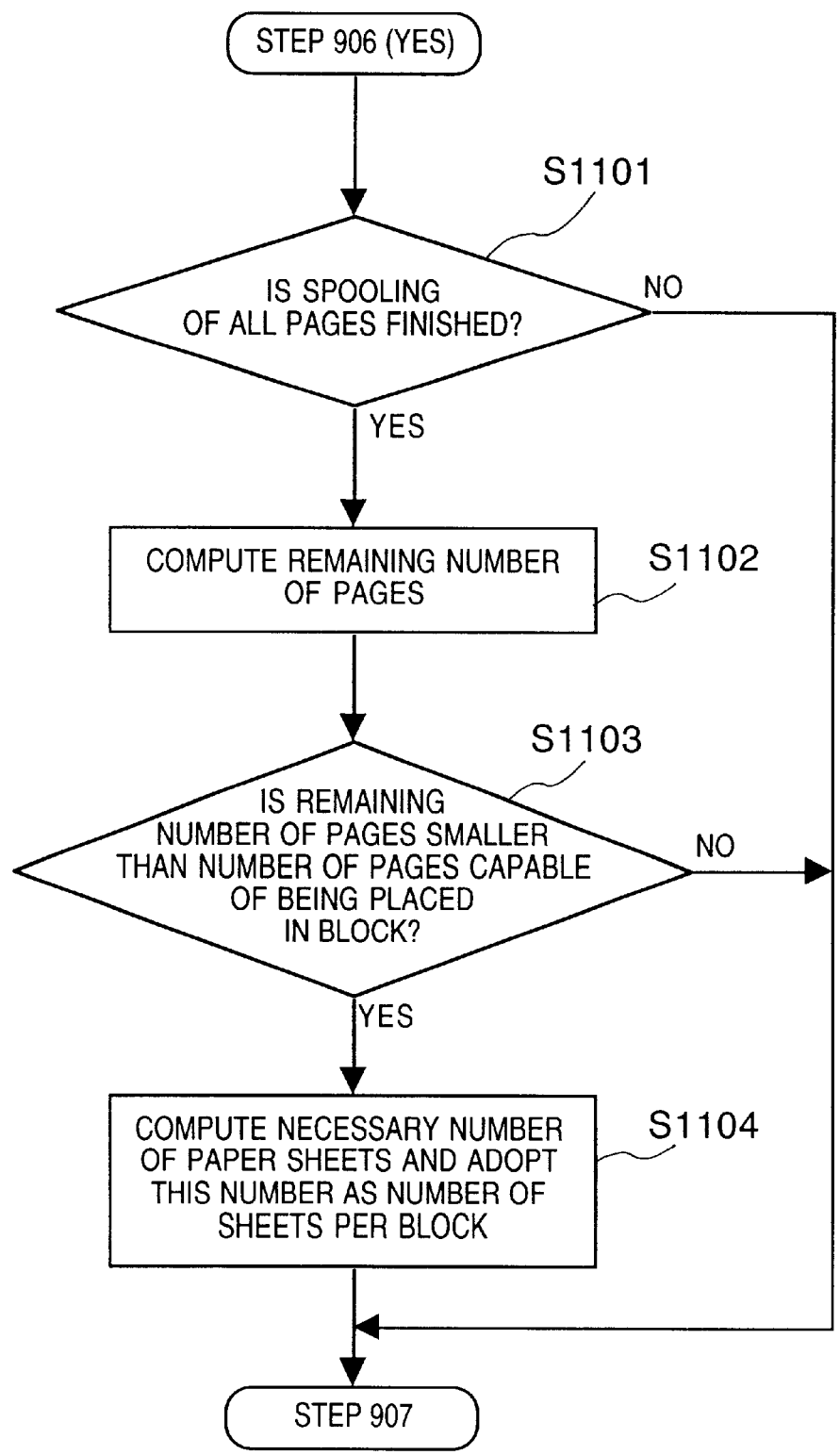
FIG. 11 is a flowchart illustrating processing for paper conservation in a final block in bookbinding printing in which a specified number of pages are bound.

The processing shown in FIG. 11 makes it possible to achieve the reduction in number of sheets of paper if the processing is executed between steps 906 and 907 in FIG. 9 in a case where a "YES" decision is rendered at step 906.

First, it is determined at step 1101 whether the spooling of all pages is finished (whether the spooling of the final page of the print job has been completed). Control proceeds to step 1102 if the answer is "YES". Processing is exited if the answer is "NO".

The remaining number of pages is computed at step 1102 in accordance with the following equation:

number of remaining pages=(print pages from application)−(current bookbinding printing enabling page)

The number of pages contained in the currently set block is compared with the remaining number of pages at step 1103. If the number of remaining pages is smaller, control proceeds to step 1104. If the number of remaining pages is not smaller, it is construed that adjustment processing is not necessary and processing is exited.

The smallest number of sheets of paper on which the remaining pages will fit is obtained at step 1104 in accordance with the following equation:

new number of sheets per block=number of remaining pages÷4
  (fractions below the decimal point are rounded up)

If the last block is printed from step 907 onward using the new bookbinding block thus obtained, the number of blank pages will be three at most. As a result, printing paper is not wasted. In addition, the number of printed pages is reduced as well, thereby shortening the time required for printout.

This processing is applied also to a case where a block that is larger than necessary has been specified in regard to a printed page. For example, in a case where bookbinding printing has been specified such that ten sheets serve as one block in regard to 30 pages of print data from the application, the number of sheets of paper actually required is eight sheets. Accordingly, the number of sheets per block is adjusted from ten to eight. This provides an output result the same as that in a case where bookbinding printing is performed over an entire page.

By virtue of the above-described processing, it is possible to perform bookbinding printing while making joint use of the printing device and host functions. This makes it possible to lighten the operating load on the user.

(Second Embodiment)

In the first embodiment, the printing device and host are switched between in bookbinding printing and the host performs bookbinding printing in a case where this is carried out with a specified number of sheets serving as the block of sheets for bookbinding. In this embodiment, however, bookbinding printing with a specified number of sheets serving as the block is implemented using the bookbinding printing function on the side of the printing device.

Here it is assumed that the only bookbinding printing function of the printing device is the bookbinding printing function in which a block of sheets for bookbinding is obtained from all pages to be printed. More specifically, while job division processing is being executed on the host side, pages are transmitted from the despooler 305 to the printing device in the usual page order. On the side of the printing device, on the other hand, an operation similar to bookbinding printing is performed with regard to a plurality of jobs by the above-mentioned job division processing. The processing will now be described in detail.

Figure 13:
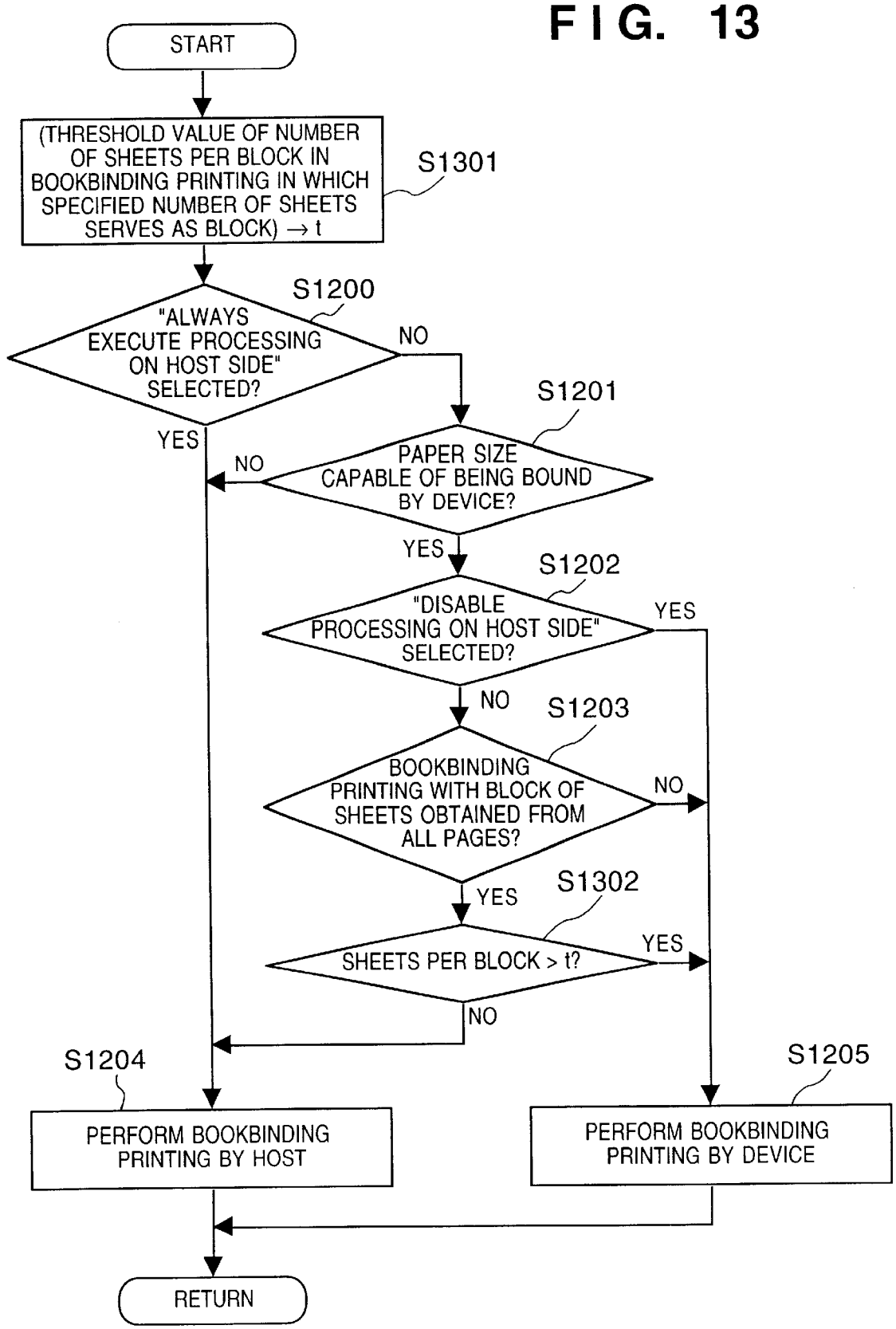
FIG. 13 is a flowchart useful in describing processing for determining whether bookbinding printing is to be performed by a printing device or by a host in a second embodiment.

FIG. 13 is a flowchart illustrating processing for deciding the switching between the printing device and host in bookbinding printing. Processing steps in FIG. 13 similar to those of the flowchart shown in FIG. 12 are designated by like step numbers.

A threshold value of number of sheets per block is provided at step 1301 in regard to bookbinding printing in which a specified number of sheets serves as the block of sheets. This value can be adjusted depending upon the specifications of the printing device, the capability of the host, etc. The value can be set so as to optimize bookbinding processing.

Processing similar to that of FIG. 12 is executed on the basis of this set value from this step onward. However, if it is determined at step 1203 that bookbinding printing is such that any specified number of sheets is adopted as a block of sheets, control proceeds to step 1302. Here the currently specified number of sheets in the block and the threshold value of step 1301 are compared. If the number of sheets in the block exceeds the threshold value, bookbinding printing utilizing the bookbinding function of the printing device is performed; otherwise, the host performs bookbinding printing with the number of sheets in the block in a manner similar to that described in the first embodiment.

Figure 17:
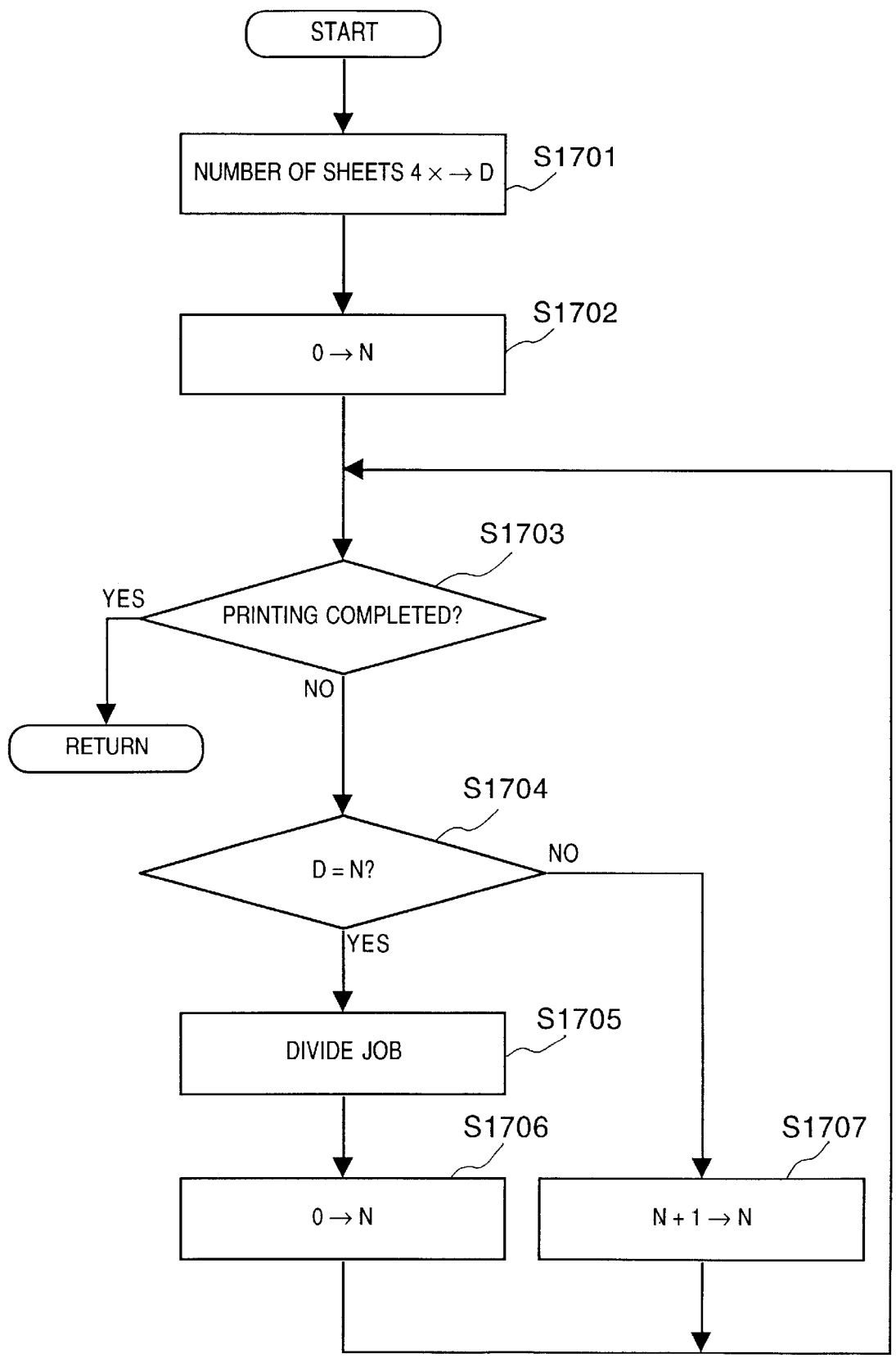
FIG. 17 is a flowchart illustrating processing for combining bookbinding printing by a printing device and job division processing by a host in the second embodiment.

Reference will now be had to the flowchart of FIG. 17 to describe a characterizing feature of this embodiment, namely a method of implementing bookbinding printing with a specified number of pages in a block by utilizing bookbinding printing with a block of all sheets possessed by the printing device, and carrying out printing processing in the usual page order on the host side, during which time job division processing is executed in mid-course.

First, at step 1701, calculation is performed to determine the page intervals of the application at which the job should be divided. In case of bookbinding printing in which any specified number of sheets is adopted as the block, the number of pages P plotted in one block is P=number of sheets×4.

Accordingly, the specified number of sheets×4 is substituted for a page unit D at which job division is performed.

A counter N is initialized to zero at step 1702.

It is determined at step 1703 whether the printing of all jobs has been completed. If the answer is "YES", processing is exited. If the answer is "NO", control proceeds to step 1704, at which the counter N and D are compared. If the two are equal, control proceeds to step 1705; otherwise, control proceeds to step 1707.

The print job is cut at step 1705. By dividing the print job, the printer can execute bookbinding processing with regard to pages transmitted to it thus far. More specifically, job division is performed by having the despooler 305 issue a print end command to the system spooler 204 and then issue a print start command immediately thereafter while the same printing settings are used.

The counter N is initialized to zero at step 1706 and then is incremented by +1 at step 1707.

By virtue of the processing described above, bookbinding printing with a block of all pages possessed by the printing device is utilized and, while print processing is being executed on the host side in the usual page order, job division processing is executed in mid-course. This makes it possible to realize bookbinding with a specified number of sheets in a block and increases the variety of allocation of processing between the printing device and host.

(Other Embodiments)

The present invention can be applied to a system constituted by a plurality of devices (e.g., a host computer, interface, reader, printer, etc.) or to an apparatus comprising a single device (e.g., a copier or facsimile machine, etc.).

Further, the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Figure 18:
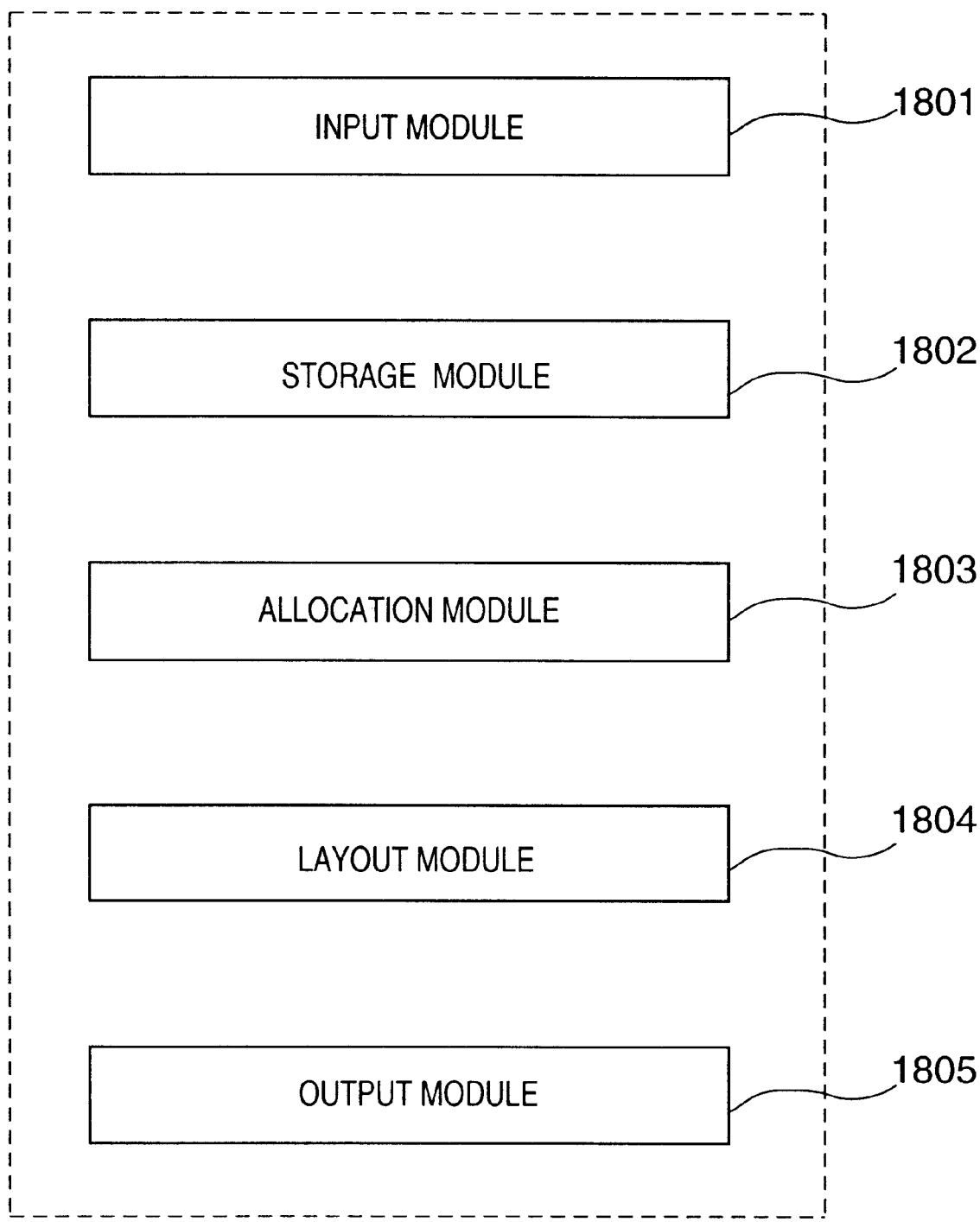
FIG. 18 is a diagram illustrating the memory map of a storage medium.

In a case where the present invention is applied to the above-mentioned storage medium, program code corresponding to the flowcharts described earlier is stored on this storage medium. Modules indicated in the example of the memory map shown in FIG. 18 are stored on the storage medium.

Specifically, it will suffice if program code of at least the following modules is stored on the storage medium: an input module 1801, a storage module 1802, an allocation module 1803, a layout module 1804 and an output module 1805.

In the embodiments set forth above, a case is described in which both a host computer and a printing device are equipped with a processing function for implementing bookbinding printing. However, the present invention is applicable even if both the host computer and printing device are not equipped with this processing function.

More specifically, the present invention is applicable also in a case where a plurality of page-order control functions for implementing bookbinding printing are provided within one structure, as in a case where the host computer is equipped with the above-mentioned processing function together with an operating system, application program and driver (or utilities).

Thus, as described above, printing control is configured using a unified user interface, and functions possessed redundantly by first and second information processing units are controlled to make possible appropriate printing control in conformity with settings made by the user.

As many apparently widely different embodiments of the present invention can be made without departing from the spirit and scope thereof, it is to be understood that the invention is not limited to the specific embodiments thereof except as defined in the appended claims.

What is claimed is:

1. A printing control system for printing print data generated by an information processing apparatus, comprising:

input means for configuring bookbinding by designating a page layout on a recording medium;

storage means for storing the print data so that the print data can be read out in a desired sequence in units of individual pages;

allocation means for deciding, based upon bookbinding settings, whether control of bookbinding is to be performed by a first information processing unit or a second information processing unit;

layout means for controlling the page layout of the print data in accordance with the bookbinding settings and a decision made by said allocation means; and output means for reading print data out of said storage means in a sequence that is in accordance with the controlled page layout, and subjecting the print data to print processing.

2. The system according to claim 1, wherein said storage means stores the print data in a data format, in which printing can be controlled, before the generation of final print data.

3. The system according to claim 1, wherein said allocation means controls the page layout on the recording medium, on the basis of prescribed print-format data that has been input from said input means, in such a manner that when all printouts are overlapped and folded in half, the pages will be in numerical order.

4. The system according to claim 1, wherein said allocation means controls the page layout on a recording medium, on the basis of prescribed print-format data that has been input from said input means, in such a manner that when printouts on a prescribed number of sheets are overlapped and folded in half, the pages will be in numerical order.

5. The system according to claim 1, wherein said allocation means decides whether bookbinding processing is to be executed by the first information processing unit or by the second information processing unit in accordance with a command from a user.

6. The system according to claim 1, wherein the bookbinding settings include orientation information for setting whether bound pages open to the right or open to the left, and said layout means decies the page layout in conformity with the orientation information.

7. The system according to claim 1, wherein said allocation means causes the first information processing unit and the second information processing unit to share bookbinding control at a predetermined ratio in accordance with a command from a user.

8. A printing control method for printing print data generated by an information processing apparatus, comprising:

an input step of configuring bookbinding by designating a page layout on a recording medium;

a storage step of storing the print data so that the print data can be read out in a desired sequence in units of individual pages;

an allocation step of deciding, based upon bookbinding settings, whether control of bookbinding is to be performed by a first information processing unit or a second information processing unit;

a layout step of controlling the page layout of the print data in accordance with the bookbinding settings and decision made at said allocation step; and an output step of reading print data out of storage means in a sequence that is in accordance with the controlled page layout, and subjecting the print data to print processing.

9. The method according to claim 8, wherein said storage step stores the print data in said storage means in a data format, in which printing can be controlled, before the generation of final print data.

10. The method according to claim 8, wherein said allocation step controls the page layout on the recording medium, on the basis of prescribed print-format data that has been input at said input step, in such a manner that when all printouts are overlapped and folded in half, the pages will be in numerical order.

11. The method according to claim 8, wherein said allocation step controls the page layout on a recording medium, on the basis of prescribed print-format data that has been input at said input step, in such a manner that when printouts on a prescribed number of sheets are overlapped and folded in half, the pages will be in numerical order.

12. The method according to claim 8, wherein said allocation step decides whether bookbinding processing is to be executed by the first information processing unit or by the second information processing unit in accordance with a command from a user.

13. The method according to claim 8, wherein the bookbinding settings include orientation information for setting whether bound pages open to the right or open to the left, and said layout step decides the page layout in conformity with the orientation information.

14. The method according to claim 8, wherein said allocation step causes the first information processing unit and the second information processing unit to share bookbinding control at a predetermined ratio in accordance with a command from a user.

15. A storage medium storing a printing control program for printing print data generated by an information processing apparatus, said control program comprising:

code of an input step of configuring bookbinding by designating a page layout on a recording medium;

code of a storage step of storing the print data so that the print data can be read out in a desired sequence in units of individual pages;

code of an allocation step of deciding, based upon bookbinding settings, whether control of bookbinding is to be performed by a first information processing unit or a second information processing unit;

code of a layout step of controlling the page layout of the print data in accordance with the bookbinding settings and a decision made at said allocation step; and code of an output step of reading print data out of storage means in a sequence that is in accordance with the controlled page layout, and subjecting the print data to print processing.

16. The storage medium according to claim 15, wherein said code of said storage step stores the print data in the storage means in a data format, in which printing can be controlled, before the generation of final print data.

17. The storage medium according to claim 15, wherein said code of said allocation step controls the page layout on the recording medium, on the basis of prescribed print-format data that has been input at said input step, in such a manner that when all printouts are overlapped and folded in half, the pages will be in numerical order.

18. The storage medium according to claim 15, wherein said code of said allocation step controls the page layout on a recording medium, on the basis of prescribed print-format data that has been input at said input step, in such a manner that when printouts on a prescribed number of sheets are overlapped and folded in half, the pages will be in numerical order.

19. The storage medium according to claim 15, wherein the code of said allocation step decides whether bookbinding processing is to be executed by the first information processing unit or by the second information processing unit in accordance with a command from a user.

20. The storage medium according to claim 15, wherein the bookbinding settings include orientation information for setting whether bound pages open to the right or open to the left, and said code of said layout step decides the page layout in conformity with the orientation information.

21. The storage medium according to claim 15, wherein said code of said allocation step causes said first information processing unit and the second information processing unit to share bookbinding control at a predetermined ratio in accordance with a command from a user.

* * * * *

UNITED STATES PATENT AND TRADEMARK OFFICE
CERTIFICATE OF CORRECTION

PATENT NO. : 6,509,977 B1 Page 1 of 1
DATED : January 21, 2003
INVENTOR(S) : Yasuhiro Kujirai et al.

It is certified that error appears in the above-identified patent and that said Letters Patent is hereby corrected as shown below:

Drawings,
In Figure 15, "CATHERING" should read -- GATHERING --.

Column 1,
Line 58, "has been" should read -- has been set --.

Column 7,
Line 9, "a" should read -- as --.

Column 17,
Line 48, "decies" should read -- decides --.

Signed and Sealed this

Twenty-third Day of September, 2003

JAMES E. ROGAN
*Director of the United States Patent and Trademark Office*